United States Patent
Pitt et al.

(10) Patent No.: US 7,416,105 B2
(45) Date of Patent: Aug. 26, 2008

(54) SUPERPLASTICALLY FORMING OF FRICTION WELDED STRUCTURAL ASSEMBLIES

(75) Inventors: Franna S. Pitt, Auburn, WA (US); Keith McTernan, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 11/123,807

(22) Filed: May 6, 2005

(65) Prior Publication Data

US 2006/0249560 A1 Nov. 9, 2006

(51) Int. Cl.
*B23K 31/02* (2006.01)
*B21D 39/00* (2006.01)

(52) U.S. Cl. .............. 228/157; 228/190; 72/60

(58) Field of Classification Search .......... 228/112.1, 228/2.1, 157, 190, 181, 114, 203; 428/593, 428/598, 615; 148/564; 72/60
See application file for complete search history.

(56) References Cited

U.S. PATENT DOCUMENTS

| | | | | |
|---|---|---|---|---|
| 3,927,817 | A * | 12/1975 | Hamilton et al. | 228/157 |
| 5,881,459 | A * | 3/1999 | Yasui | 29/897.32 |
| 5,955,207 | A * | 9/1999 | Lederich et al. | 428/660 |
| 6,537,682 | B2 | 3/2003 | Colligan | |
| 6,547,895 | B2 * | 4/2003 | Bradley et al. | 148/535 |
| 6,568,582 | B2 * | 5/2003 | Colligan | 228/112.1 |
| 6,712,916 | B2 | 3/2004 | Mishra et al. | |
| 6,825,442 | B2 * | 11/2004 | Schroth et al. | 219/137 WM |
| 6,854,634 | B2 * | 2/2005 | Litwinski et al. | 228/112.1 |
| 2002/0079351 | A1 | 6/2002 | Mishra et al. | |
| 2003/0192939 | A1 | 10/2003 | Mishra | |
| 2004/0197532 | A1 * | 10/2004 | Barnes | 428/195.1 |
| 2004/0238601 | A1 * | 12/2004 | Franchet et al. | 228/173.1 |
| 2005/0189791 | A1 * | 9/2005 | Chernoff et al. | 296/193.07 |
| 2006/0086774 | A1 * | 4/2006 | Sanders et al. | 228/112.1 |

OTHER PUBLICATIONS

*Superplastic Forming/Adhesive Bonding of Aluminum (SPF/AB) Multi-Sheet Structures*, J. D. Will et al., NASA/CR-2003-212400, May 2003, pp. 1-12.
*Superplastic Behavior of Friction Stir Processed Aluminum-Lithium Alloy*, I. Charit et al., Fiction Stir Welding and Processing, The Minerals, Metals & Materials Society, 2001, pp. 225-234.
*High Strain Rate, Thick Section Superplasticity Created Via Fiction Stir Processing*, M. Mahoney et al., Fiction Stir Welding and Processing, The Minerals, Metals & Materials Society, 2001, pp. 183-194.

(Continued)

*Primary Examiner*—Kevin Kerns
*Assistant Examiner*—Michael Aboagye
(74) *Attorney, Agent, or Firm*—Alston & Bird LLP (57) ABSTRACT

A method for superplastically forming a preform to manufacture a structural assembly with a contoured configuration is provided. The preform includes first and second structural members in a stacked configuration, with at least one additional peripheral member abutting the stack and joined thereto by a friction welded butt joint. In some cases, the preform defines dissimilar forming characteristics throughout, such as variations in material or thickness according to the amount of superplastic forming to be performed in each portion of the preform.

14 Claims, 4 Drawing Sheets

OTHER PUBLICATIONS

*Metal Producing & Processing, Tailored Blanks Drive Design Decisions*, Penton Media, Inc. 2004, http://www.33metalproducing.com/full_story.php?WID=11222, Mar. 22, 2004, 1 page.

*Alloys: 5083—the all rounder*, http://www.superform-aluminium.com/technical/Alloys/alloys-5083.html, Jan. 26, 2004, 1 page.

*Friction Stir Welding in the Automotive Body in White Production*, S. Kallee, First International Symposium on Friction Stir Welding, Jun. 14-16, 1999, pp. 1-11.

*Friction Stir Processing Creates Aluminum-Alloy Superplasticity*, M. Mahoney et al., http://www.industrialheating.com/CDA/ArticleInformation/coverstory/BNPCoverStoryItem/0,2830,71785,00.html, pp. 1-5.

* cited by examiner

SUPERPLASTICALLY FORMING OF FRICTION WELDED STRUCTURAL ASSEMBLIES

BACKGROUND OF THE INVENTION

1) Field of the Invention

The present invention relates to superplastically formed structural assemblies and, more particularly, to the superplastic forming of an assembly using a friction welded preform.

2) Description of Related Art

Under certain conditions, some materials can be plastically deformed without rupture well beyond their normal limits. This property, called superplasticity, is exhibited by certain metals and alloys within limited ranges of temperature and strain rate. For example, titanium and its alloys are superplastic in the temperature range from about 1450-1850° F. (785-1010° C.). Superplastic forming (SPF) is a technique for expanding or stretching metal that relies on superplasticity. Expansion can and often does exceed 100% and often exceeds 1000%. During one typical superplastic forming process, a preform or blank is placed into a shaping die and heated to a sufficiently high temperature within the superplasticity range of the material to soften the material. Pressurized heated gas is then injected against the material, thereby causing the preform to be urged against the die. Alternatively, the preform can be urged into a desired shape using other methods, such as by using a die. Such superplastic forming methods are further described in U.S. Pat. Nos. 4,117,970; 5,410,132; 5,420,400; 5,700,995; 5,705,794; 5,914,064; 6,337,471; 6,537,682; and 6,568,582, and U.S. application Ser. No. 10/781,419, each of which is incorporated by reference.

Superplastic forming can be performed with certain materials that exhibit superplastic properties within limited ranges of temperature and strain rate. Thus, a preform or blank that is to be superplastic formed must typically be made of a material that is capable of undergoing superplastic forming. However, even if the material is made of a superplastically formable material, cracks or other defects can occur during forming in portions of the preform where the forming characteristics have been compromised. For example, fusion weld joints can become rough or thickened when subjected to superplastic forming and, therefore, any such joints that are subjected to superplastic forming may require post-forming hand working to finish the surface. This adds cost and time to the manufacturing process.

During one conventional superplastic forming operation, a pack is formed of two or more titanium sheets that are stacked and joined by diffusion bonding, e.g., about a periphery of the sheets. With the pack heated, pressurized gas can be injected between the sheets to inflate the pack and thereby superplastically form the sheets. While this operation has proven effective for forming titanium packs, other materials cannot be easily formed in this manner. For example, aluminum does not have the same diffusion bonding characteristics as titanium, and cannot easily be bonded sufficiently for superplastic forming. Further, conventional weld joints formed through the aluminum sheets are typically not capable of undergoing extensive superplastic forming and therefore can fail during the forming operation, e.g., by delamination of the two sheets.

Thus, there exists a need for an improved preform and associated method for superplastically forming structural assemblies. The method should be compatible with aluminum, and should be capable of sufficiently bonding members for superplastic forming.

BRIEF SUMMARY OF THE INVENTION

The present invention provides a preform and a method for superplastically forming a preform to manufacture a structural assembly with a predetermined configuration. In one embodiment, the preform includes first and second structural members in a stacked configuration, which are joined by a friction welded butt joint to one or more additional structural members abutting the stacked first and second structural members at a periphery of the stack. The first and/or second structural member of the preform can be superplastically formed to a predetermined contoured configuration, e.g., by delivering a pressurized fluid between the first and second structural members. The combined thickness of the stacked first and second structural members can be about equal to the thickness of the additional structural member(s) at the periphery of the stack, and the friction welded butt joint between the stack and the additional member(s) at the periphery of the stack can sufficiently join the first and second structural members for the forming operation.

According to one embodiment, the preform defines a first portion that is superplastically formed and a second portion that is not superplastically formed. The first and second portions, which can be defined by different structural members, can be characterized by dissimilar forming characteristics. For example, the portions can be made of different materials, can have different thicknesses, and/or can be capable of being superplastically formed by different amounts. Thus, each portion can be formed by a dissimilar amount, e.g., so that a portion that is more superplastically formable than another portion is formed by a greater amount.

BRIEF DESCRIPTION OF THE SEVERAL VIEWS OF THE DRAWINGS

The accompanying drawings illustrate preferred and exemplary embodiments and are not necessarily drawn to scale.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth. Like numbers refer to like elements throughout.

Figure 1:
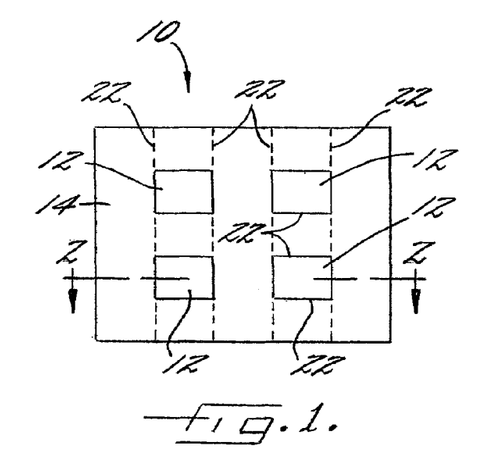
FIG. 1 is a plan view illustrating a preform.

A tailored blank or preform 10 according to one embodiment of the present invention is shown in FIG. 1. The preform 10 is an assembly of structural members 12, 14 joined, in this case, by friction stir welding so that the preform 10 defines different portions corresponding to the position of the different structural members. Alternatively, the members 12, 14 can be joined by other types of friction welding, fusion welding, or laser welding. In the embodiment of FIG. 1, the preform 10 is made of four similar structural members 12 that are positioned in apertures defined by another structural member 14 and friction stir welded to the member 14. Thus, the preform 10 is a sheet-like member having first portions defined by the first structural members 12 and a second portion defined by the second structural member 14. The members 12, 14 can each be anisotropic in at least one property. For example, each member 12, 14 is typically a stock part that has uniform thickness and material properties throughout.

The structural members 12, 14 to be used in the preform 10 can be selected and configured in the preform 10 according to the desired properties of the finished structural assembly 20 (FIGS. 3 and 4) and the forming requirements for producing the assembly 20 from the preform 10. Thus, the configuration of the preform 10 can be determined according to the desired contoured configuration of the structural assembly 20 and the properties that are desired throughout the assembly 20. Typically, each of the structural members 12, 14 selected for forming the preform 10 defines an area that is less than the total area of the preform 10. Thus, the structural members 12, 14 can be configured in a side-to-side, non-overlapping relationship as illustrated in FIG. 1.

Figure 2:
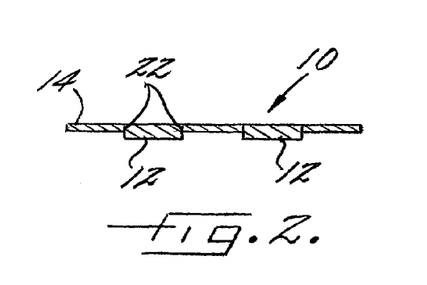
FIG. 2 is a section view as seen along line 2-2 of FIG. 1.

The first structural members 12 have at least one forming characteristic that is dissimilar from the second structural member 14. The term "forming characteristic" is used to refer to a characteristic that affects the superplastic formability of the structural members 12, 14. For example, as shown in FIG. 2, the first structural members 12 are thicker than the second structural member 14 before thinning to a minimum allowed thickness. Therefore, the first structural members 12 can be formed to a greater extent than the second structural members 14 while resulting in at least a minimum thickness after forming. Other forming characteristics besides thickness include the material properties of the members 12, 14 such as the modulus of elasticity.

The structural members 12, 14 of the preform 10 are preferably joined by one or more friction stir weld joints 22 to fuse the materials. Friction stir welding, which is further described in U.S. Pat. No. 5,460,317, generally includes plasticizing material at an interface where each joint is to be formed by urging a rotating pin through the members along the interface. The formation of the joints 22 by friction stir welding can refine the grain structure of the members 12, 14 at and proximate to the joints 22, thereby improving the elongation properties of the structural members 12, 14 and providing joints 22 that are capable of undergoing superplastic formation, described, for example, in U.S. Pat. No. 5,460,317.

At least part of the preform 10 is superplastically formed to a predetermined contoured configuration to produce the structural assembly 20. According to a conventional superplastic forming operation, the preform 10 can be heated to a superplastic forming temperature and subjected to a pressure differential, i.e., a relatively high pressure on one side of the sheet-like preform 10 and a relatively low pressure on the opposite side. For example, the preform 10 can be disposed in a closed die, and gas can be provided to or from the die to achieve the required pressures in the die on the opposite sides of the preform 10. In some cases, the preform 10 can be heated in conjunction with the superplastic forming operation, e.g., using an induction heater that induces a current in the workpiece or blank itself or in adjacent or surrounding susceptors in thermal communication with the preform 10. Such induction heating apparatus and methods are described in U.S. Pat. Nos. 4,622,445; 6,566,635; and 6,180,932, which are also incorporated by reference.

The preform 10 is typically superplastically formed by dissimilar amounts. That is, the first portions can be superplastically formed by different amounts than the second portion, and, in some cases, some parts of the preform 10 are not superplastically formed. Typically, the preform 10 is provided with dissimilar forming characteristics throughout according to the amount and location of superplastic forming that is to be performed. In particular, the first and second structural members 12, 14 can be different materials, have different thicknesses, or be otherwise dissimilar so that the corresponding first and second portions of the preform 10 are capable of being superplastically formed by different amounts.

Figure 3:
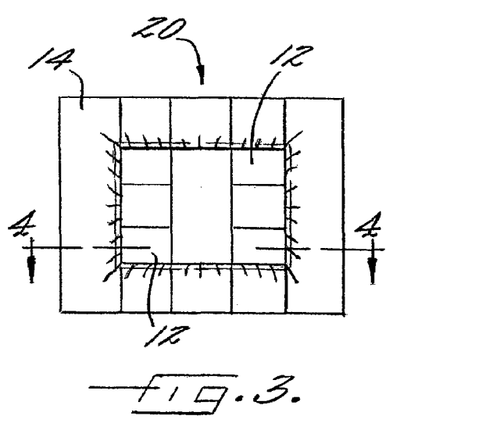
FIG. 3 is a plan view illustrating a structural assembly formed from the preform of FIG. 1.
Figure 4:
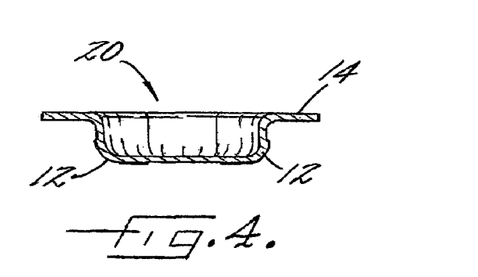
FIG. 4 is a section view as seen along line 4-4 of FIG. 3.

For example, as shown in FIGS. 1 and 2, the first structural members 12 can be thicker than the second structural member 14 so that first portions of the preform 10 can be superplastically formed to a greater extent than the second portion without reducing the thickness of any part of the preform 10 below a particular minimum thickness. Thus, the first structural members 12 can be provided at those locations of the preform 10 that are to be formed by the greatest amount, i.e., at the corners of a pocket that is defined by the structural assembly 20 after superplastic forming as shown in FIGS. 3 and 4. In some cases, the first structural members 12 can be provided with sufficient thickness so that, after superplastic forming, the first portions have at least a minimum thickness, such as a thickness that is equal to or greater than the thickness of the second portions. In fact, a required thickness for each of the structural members 12, 14 can be determined according to the amount of forming to be performed in the corresponding portion of the preform 10 and the desired thickness in the corresponding portion of the structural assembly 20. Thus, the structural members 12, 14 can be selected accordingly to the required thickness so that the desired thickness is attained in the corresponding portion of the structural assembly 20 during the superplastic forming operation.

In addition or alternative to the dissimilarity in thickness, the portions of the preform 10 can define other dissimilarities in forming characteristics. In particular, the first and second structural members 12, 14 can be made of different materials that are capable of being superplastically formed by different amounts. For example, the first structural members 12, and hence the first portions of the preform 10 shown in FIG. 1, can be formed of a material such as an aluminum or titanium alloy that is capable of undergoing greater amounts of superplastic forming than the material of the second portion, i.e., the second structural member 14, which can be formed of another aluminum or titanium alloy or steel. In cases where one portion will not be superplastically formed, that portion could be made of a nonsuperplastically formable material, i.e., a material that is generally incapable of being superplastically formed. Similarly, if a portion is to be only slightly formed, that portion can be formed of a material that is capable of slight forming.

Figure 5:
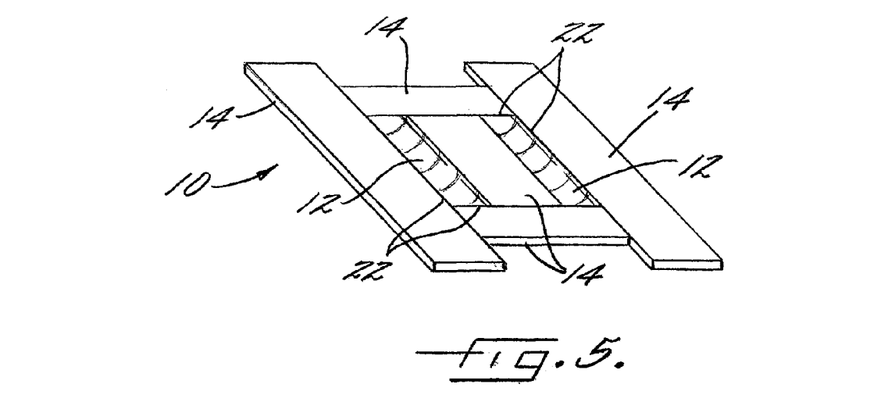
FIG. 5 is a perspective view illustrating another preform.

For example, FIG. 5 illustrates a preform 10 that includes first and second portions defined by first and second structural members 12, 14, respectively, which are joined by friction stir weld joints 22. The first and second portions, which can have similar or dissimilar thicknesses, are made of dissimilar materials. In particular, the first portions are made of a superplastically formable material, such as aluminum 5083, while the second portions are made a generally nonsuperplastically formable material, such as aluminum 6061. Thus, the first portions can define the locations of the preform 10 where superplastic forming is to occur, and the second portions can define the locations where superplastic forming will not occur. The material used for the second portions can provide other features or benefits to the preform 10, the assembly 20, or the manufacturing operation, such as by increasing the strength of the assembly 20, decreasing the weight of the assembly 20, or decreasing the cost for manufacturing the assembly 20. In particular, the second structural members 14 can be provided at locations where the material is to be trimmed after forming, e.g., at the periphery of the preform 10 as shown in FIG. 5. Thus, a cheaper (and possibly non-superplastically formable) material can be used for the second structural members 14 relative to the first structural members 12. Superplastically formable materials with various superplastic forming properties include aluminum and titanium alloys, microduplex stainless steels, some Inconel® alloys (a trademark of Huntington Alloys Corporation), and the like. Particular SPF alloys include Al 2004, 7475 and 5083, Ti 6-4 (including fine grain versions thereof), 3-2.5, 6-6-2, 6-2-4-2, 6-2-4-6, and 6-2-2-2-2, IMI550, Inconel 625. In addition, some materials, such as Ti 15-3-3-3, can be formed using superplastic techniques to achieve elongation values that are less than superplastic but greater than normally expected. Each material has characteristic properties such as ideal temperatures and strain rates for SPF, flow stresses for SPF, and mechanical properties after forming.

The structural members 12, 14 of the present invention can be formed of a variety of materials, including various metals and metal alloys. Preferably, the preforms 10 and, hence, the structural assemblies 20 are formed of materials that can be welded together using friction welding or friction stir welding (FSW) to form the friction weld joints 22 before superplastic forming of the preforms 10. Materials that can be friction stir welded and formed according to the present invention include, but are not limited to, aluminum, aluminum alloys, titanium, titanium alloys, nickel alloys, and stainless steel. Further, the structural members 12, 14 can be formed of materials that are difficult to weld by conventional fusion welding processes, e.g., materials that are characterized by a high thermal conductivity and that typically quickly dissipate heat away from conventional fusion weld joints and/or that exhibit cracking along conventional fusion weld joints as a result of stresses caused by thermal expansion. Such materials can include aluminum, aluminum lithium, and titanium alloys such as Al 7000 series, Al 2195, and Ti 6Al-4V. Advantageously, many of these materials possess special corrosion, fatigue, strength, or ductility characteristics that are desired in certain applications.

Figures 6, 7:
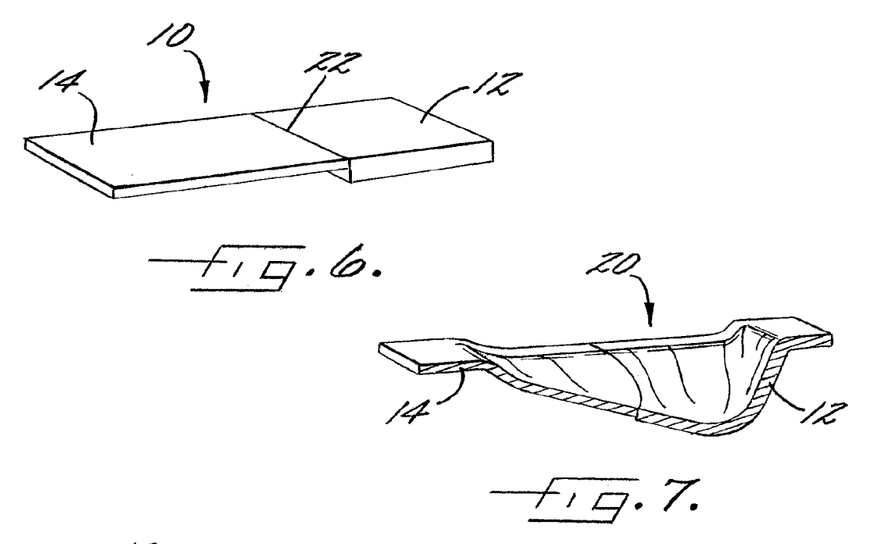
FIG. 6 is a perspective view illustrating another preform.
FIG. 7 is a section view illustrating a structural assembly formed from the preform of FIG. 6.

FIG. 6 illustrates another preform 10 that can be superplastically formed to produce the structural assembly 20 of FIG. 7. The first and second portions of the preform 10 are defined by first and second structural members 12, 14, respectively, which are connected by a weld joint 22 formed by friction stir welding. The first structural member 12 has a greater thickness than the second structural member 14 and/or can be made of a material that is capable of being superplastically formed to a greater extent than the second structural member 14. For example, each of the members can be formed of sheetstock that is typically produced and made available in a wide range of thicknesses, e.g., between about 0.020 inch to 0.187 inch. In the configuration illustrated in FIG. 6, each of the members 12, 14 is typically no more than about 50% greater in thickness than the adjacent member(s), though greater differences in thickness can be used in some cases, such as where the thickness of one or more of the members is tapered at the end proximate the adjacent member. During the superplastic forming operation, the first portion is superplastically formed, and the second portion is formed to a lesser extent, either superplastically or nonsuperplastically. The thickness of the first portion is typically reduced by the superplastic forming operation. However, as shown in FIG. 7, the first portion can maintain a minimum desired thickness after forming, which can be at least as great as the thickness of the second portion.

Figure 8:
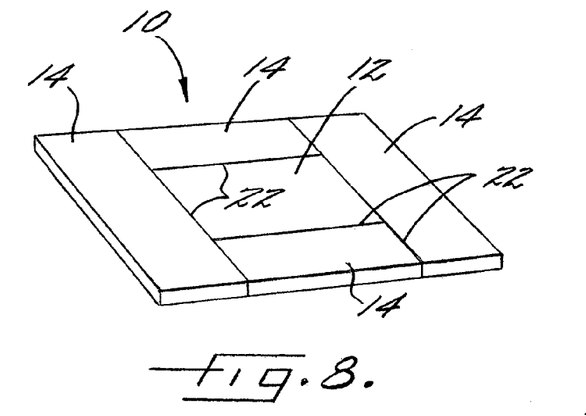
FIG. 8 is a perspective view illustrating another preform.
Figure 9:
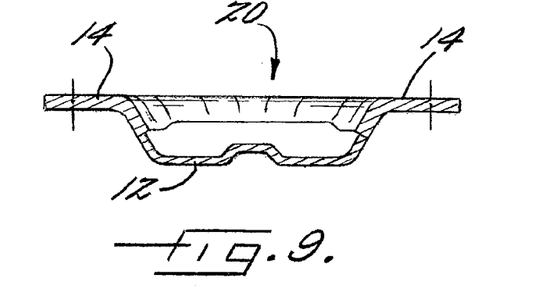
FIG. 9 is a section view illustrating a structural assembly formed from the preform of FIG. 8.

FIG. 8 illustrates another preform 10 that can be superplastically formed to produce the structural assembly 20 shown in FIG. 9. The first and second portions of the preform 10 are again defined by first and second structural members 12, 14, respectively, which are connected by weld joints 22 that are formed by friction stir welding. The first structural member 12 or the second structural members 14 can be made of a material that is capable of being superplastically formed to a greater extent than the other structural member(s) 12, 14. For example, as illustrated, the first structural member 12 is thinner than the second structural members 14, so that the first portion of the preform 10 is more superplastically formable than the second portion. During the superplastic forming operation, the first portion is superplastically formed, and the second portion is formed to a lesser extent, either superplastically or nonsuperplastically. Thus, the finished assembly 20 illustrated in FIG. 9 includes a relatively thin, formed first portion with a relatively thick, less formed second portion at the peripheral edge of the first portion. The edge provided by the second portion can extend partially or entirely around the first portion. Compared to a conventionally formed assembly produced from a sheet having uniform thickness, the assembly 20 of FIG. 9 can be lighter in weight as a result of the thinner first portion, and the thicker second portion can provide stiffness, strength, or other desired properties. In addition, the decreased thickness of the first portion can facilitate the forming of that portion.

Figure 10:
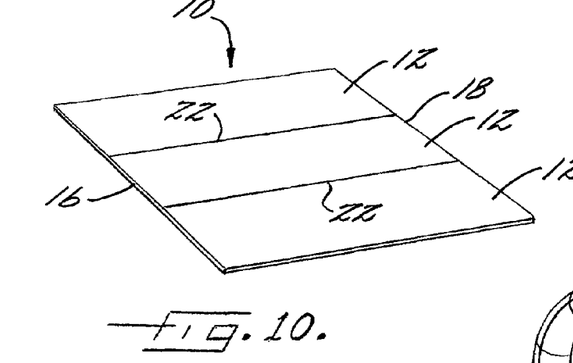
FIG. 10 is a perspective view illustrating another preform.
Figure 11:
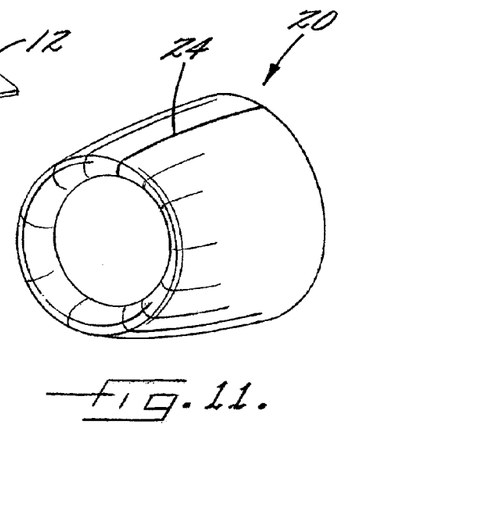
FIG. 11 is a perspective view illustrating a structural assembly formed from the preform of FIG. 10.

FIG. 10 illustrates another preform 10 that can be superplastically formed to produce the structural assembly 20 of FIG. 11. The preform 10 includes three structural members 12 that are joined by friction stir weld joints 22. The individual structural members 12 can be stock pieces of material that are commonly available, and which are joined to achieve a size or other configuration that is not commonly available. Thus, the preform 10 can be formed using standard gages rather than requiring special foundry runs or post-forging milling or chemical milling (prior to forming) or post-forming machining or milling to achieve the correct thickness. As shown, a joint 24 can be formed to join the edges 16, 18 of the preform 10 by friction welding, diffusion bonding, or otherwise, before, after, or in combination with the superplastic forming operation. Thus, the preform 10 can be used for forming a structural assembly 20, such as the superplastically formed commercial transport aircraft nacelle that is illustrated in FIG. 11, which is too large to be formed from a single stock member. For example, sheetstock is typically available in widths up to 36 inches or 48 inches wide, but the preform 10 can be made to have significantly greater width and/or length by joining multiple individual members. In addition, each of the structural members 12 can be made of a material with particular material properties, dimensions, or other aspects according to the type and amount of forming to be performed to produce the structural assembly 20 and/or according to the desired dimensions and properties throughout the structural assembly 20. Nacelles, and preforms and methods for forming nacelles, are further described in U.S. application Ser. No. 10/970,151, which is incorporated by reference.

After forming, the structural assemblies 20 can be further processed by machining, heat treatment operations, or the like. For example, the assemblies 20 can be machined to achieve smooth surfaces, uniform thickness, or other features. The finished structural assemblies 20 can be used in a variety of applications and structures, including aerospace applications such as aircraft internal structures or skins, flight control surfaces, other aircraft structural components, and the like. Alternatively, the structural assemblies 20 can be used in a variety of other industries and applications, including as structural members for automobiles, watercraft, other vehicles, building structures, and the like.

Figure 12:
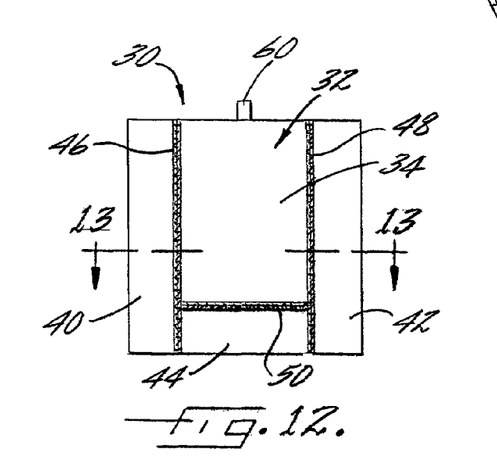
FIG. 12 is a plan view illustrating another preform.
Figure 13:
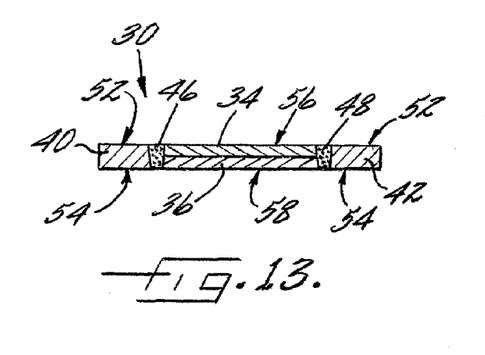
FIG. 13 is a section view as seen along line 13-13 of FIG. 12.

In some cases, the blanks or preforms formed and used according to the present invention can be configured as packs that are expanded during superplastic forming. In this regard, FIGS. 12 and 13 illustrate a preform 30 that includes a stack 32 of first and second structural members 34, 36. That is, the first and second structural members 34, 36 are arranged in a stacked configuration, typically with the members 34, 36 being parallel and coextensive. Other peripheral members 40, 42, 44 are arranged at a periphery of the stack 32 in abutting contact with the stack 32 and welded to the stack 32. In particular, as shown in FIG. 12, third, fourth, and fifth peripheral structural members 40, 42, 44 can be arranged around the periphery of the stack 32 so that each member 40, 42, 44 is adjacent one of the edges of the stack 32, with the third and fourth members 40, 42 opposite the stack 32.

In the illustrated embodiment of FIG. 12, the third, fourth, and fifth structural members 40, 42, 44 are welded to the edges of the first and second structural members 34, 36 to form butt joints 46, 48, 50. For example, as shown in FIG. 13, the welded butt joint 46 extends through each of the first and second members 34, 36 and is disposed at an edge of the stack 32 with sufficient width so that the weld joint 46 also extends through the third structural member 40. Thus, the weld joint 46 connects the first and second structural members 34, 36 and also connects the first and second structural members 34, 36 to the third structural member 40. Other structural members, such as the fourth and fifth structural members 42, 44, can similarly be connected at the other edges of the stack 32. The members 40, 42, 44 are typically welded to the periphery of the stack 32 by friction welding and, in particular, friction stir welding.

The peripheral structural members 40, 42, 44 can support the stack 32 at its periphery to increase the strength of the weld joints 46, 48, 50 and thereby resist separation of the first and second structural members 34, 35 at the weld joints 46, 48, 50 during and/or after forming. The third, fourth, and fifth structural members 40, 42, 44 are typically provided with a unitary thickness that is about equal to the combined thickness of the first and second structural members 34, 36, and the members 40, 42, 44 can be arranged substantially parallel to the stack 32. Thus, each of the members 40, 42, 44 can define opposite surfaces 52, 54 that are coplanar with respective outer surfaces 56, 58 of the first and second structural members 34, 36. The substantially coplanar relationship between the outer surfaces 56, 58 of the first and second structural members 34, 36 and the opposite surfaces 52, 54 of the peripheral members 40, 42, 44 can facilitate the formation of the friction stir welded butt joints 46, 48, 50, e.g., by providing a uniform surface against which a shoulder of a friction stir welding tool can be engaged during friction stir welding. Moreover, upon connection of the peripheral members 40, 42, 44 to the stack 32, each peripheral member 40, 42, 44 can support the stack 32, e.g., by preventing separation of the first and second structural members 34, 36, which could otherwise occur when subjected to the stresses associated with superplastic forming. That is, even if the connection extending between the first and second structural members 34, 36 is not sufficient to resist the tension associated with superplastic forming, the connection of each of the structural members 34, 36 to the respective peripheral members 40, 42, 44 can sufficiently support the stack 32 to withstand the forces associated with superplastic forming.

Figure 14:
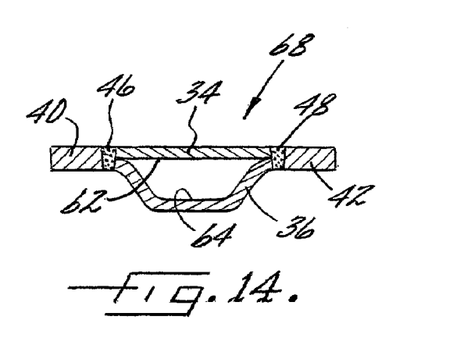
FIG. 14 is a section view illustrating a structural assembly formed from the preform of FIG. 13.

The preform 30 typically defines an interface between the stacked first and second members 34, 36 in which pressurized fluid can be received for expanding the preform 30. In this regard, the preform 30 defines a port 60 for receiving the pressurized fluid. The port 60 can be welded to the first and second structural members 34, 36 or otherwise connected to communicate fluid between the members 34, 36, and the interface is otherwise sealed about the periphery of the stack 32, i.e., by the weld joints 46, 48, 50 or other connections. Thus, the pressurized fluid can be delivered through the port 60 to expand and thereby superplastic form the preform 30. FIG. 14 illustrates an assembly 68 that is produced by superplastically forming the preform 30 of FIGS. 12 and 13 to the desired configuration.

The first and second structural members 34, 36 can also be selectively treated to prevent undesired joining in certain regions between the members 34, 36. That is, one or both of the facing surfaces 62, 64 of the structural members 34, 36, i.e., the surfaces 62, 64 directed toward the opposite member 34, 36, can be treated to reduce the likelihood of the surfaces 62, 64 becoming inadvertently bonded by thermo-compressive welding therebetween during formation of the joints 46, 48, 50. For example, the surfaces 62, 64 can be selectively anodized or otherwise treated to tailor and maintain the width of the weld joints 46, 48, 50.

Figure 15:
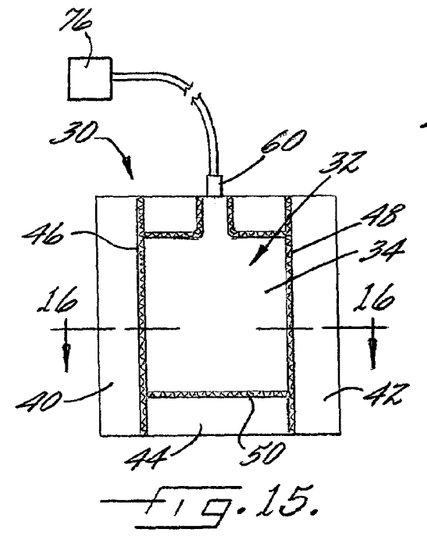
FIG. 15 is a plan view illustrating another preform.
Figure 16:
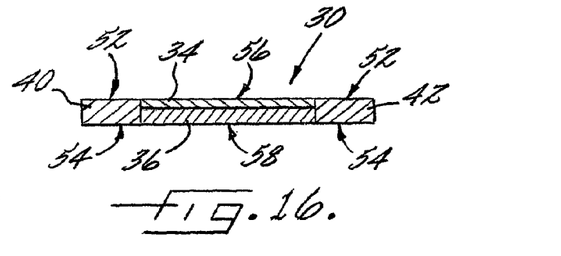
FIG. 16 is a section view as seen along line 16-16 of FIG. 15 before welding.
Figure 17:
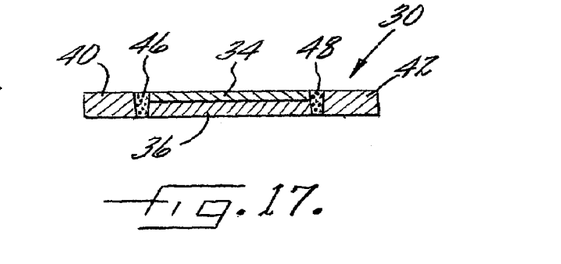
FIG. 17 is a section view similar to FIG. 16 after welding.

Each of the members 34, 36, 40, 42, 44 of the preform 30 can define dissimilar forming characteristics. That is, each member 34, 36, 40, 42, 44 can define a forming characteristic that is nonuniform throughout the member and/or is dissimilar from the corresponding characteristics of the other members 34, 36, 40, 42, 44. For example, as illustrated in FIGS. 15-17, the first structural member 34 is thinner than the second structural member 36. In addition, or alternative, the first structural member 34 can be formed of a different material than the second structural member 36, can be subjected to different material treatments, or the like. Further, in some cases, a portion that is less than the entirety of the first structural member 34 can be characterized by a forming characteristic that is different than the rest of the first structural member 34, e.g., by providing different materials, thicknesses, or treatments to the various portions of the member 34. That is, each structural member 34, 36, 40, 42, 44 can be formed by combining multiple individual members, e.g., by friction stir welding, as described above in connection with the preforms 10. In this way, the various parts of the preform 30 can be selectively provided with different degrees of formability. In particular, the formability throughout the preform 30 can be selectively provided according to the desired amount of forming or the desired resulting properties throughout the preform 30, e.g., by providing an increased formability in areas where forming will be greatest. In some cases, a relatively greater thickness can be provided in portions where the preform 30 is to be most formed, e.g., so that the thickness is substantially uniform throughout the first and second members 34, 36 after forming as shown in the assembly 68 of FIG. 19. Members or portions of members that are not to be formed, such as the periphery members 40, 42, 44 in FIGS. 12-14, can be formed of a reduced cost material that lacks the formability required in one or both of the other members 34, 36. In some cases, the nonformable and/or reduced-cost material is removed from the assembly 68 after forming. For example, after the preform 30 is superplastically formed, the periphery members 40, 42, 44 can be partially or entirely removed from the assembly 68.

Figure 18:
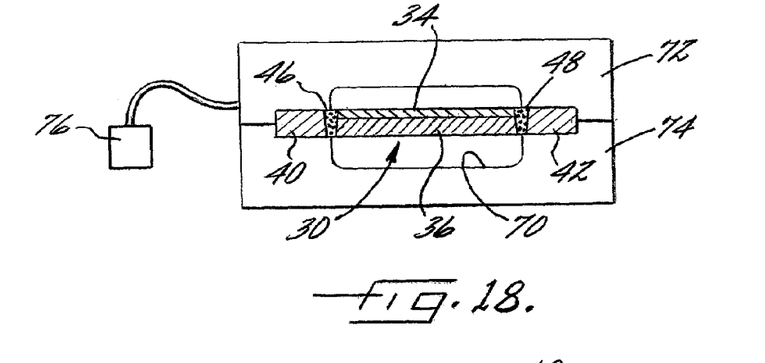
FIG. 18 is a section view of the preform of FIG. 17 in a forming die before forming.
Figure 19:
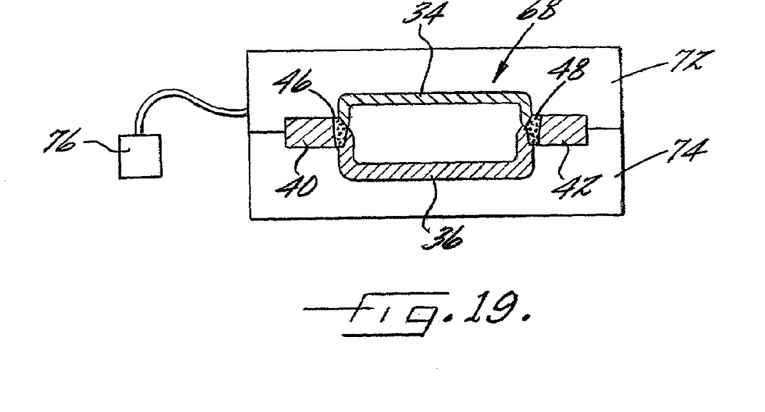
FIG. 19 is a section view illustrating a structural assembly formed from the preform of FIG. 17.

As shown in FIGS. 18 and 19, the preform 30 can be formed in a die cavity 70 that is defined by one or more cooperable die sections 72, 74. A source of pressurized fluid 76, such as an inert gas, delivers the fluid at a pressure sufficient for expanding the preform 30 and urging the first and/or second structural members 34, 36 outward against contoured surfaces defined by the die sections 72, 74. Thus, one or both of the structural members 34, 36 can be formed to the desired contour of the structural assembly 68, while the weld joints 46, 48, 50 maintain the connection between the members 34, 36. As shown in FIGS. 15-19, the weld joints 46, 48, 50 can be located at a periphery of the structural members 34, 36 and can remain substantially unformed during the superplastic forming operation. In other embodiments, the structural members 34, 36 can include weld joints that are subjected to superplastic or nonsuperplastic forming, such as weld joints extending through one or both of the structural members. For example, each member 34, 36 can be provided by welding multiple individual pieces as described above in connection with the preforms 10 of FIGS. 1, 2, 3, 5, 6, 8, and 10.

The invention is not limited to the specific disclosed embodiments. Although specific terms are employed, they are used in a generic and descriptive sense only and not for purposes of limitation.

That which is claimed:

1. A superplastic forming method for manufacturing a structural assembly having a predetermined contoured configuration, the method comprising:

providing a preform having a stack of first and second structural members, the stack abutting a third structural member and joined to the third structural member by a friction welded butt joint; and with the first and second structural members joined to the third structural member, superplastically forming at least one of the first and second structural members to a predetermined contoured configuration, wherein the providing step comprises: disposing the first and second structural members in the stacked configuration substantially parallel to the third structural member and with an edge of the first and second structural members abutting the third structural member, the third structural member having a thickness about equal to a combined thickness of the stacked first and second structural members, such that the first and third structural members define a substantially planar surface and the second and third structural members define a substantially planar surface; and friction stir welding the first, second, and third structural members to form the butt joint between the stacked first and second structural members and the third structural member.

2. A method according to claim 1, further comprising: disposing a fourth structural member abutting edges of the first and second structural members opposite the third structural member; and friction stir welding the first, second, and fourth structural members to form a butt joint between the stacked first and second structural members and the fourth structural member, wherein the superplastically forming step comprises delivering a pressurized fluid between the first and second structural members to thereby expand at least one of the first and second structural members outward.

3. A method according to claim 1 wherein at least one of the structural members comprises aluminum.

4. A method according to claim 1, further comprising selectively treating a surface of at least one of the first and second structural members that is directed toward the opposite of the first and second structural members to prevent joining at selective regions between the first and second structural members.

5. A method according to claim 1 wherein the superplastically forming step comprises superplastically forming at least a portion of a friction stir weld joint formed in at least one of the structural members.

6. A method according to claim 1 wherein the butt joint is formed at the edge of the first and second structural members such that the butt joint is substantially unformed during the superplastically forming step.

7. A method according to claim 1 wherein the preform defines first and second portions having at least one dissimilar forming characteristic.

8. A method according to claim 7 wherein the superplastically forming step comprises superplastically forming the portions of the preform by dissimilar amounts according to the forming characteristics of the portions.

9. A method according to claim 7 wherein the superplastically forming step comprises superplastically forming the first portion without superplastically forming the second portion, the first portion comprising a superplastically formable material and the second portion comprising a generally non-superplastically formable material.

10. A method according to claim 7 wherein the first and second portions of the preform comprise dissimilar materials.

11. A method according to claim 7 wherein the first and second portions define dissimilar thicknesses, and wherein the superplastically forming step comprises superplastically forming a thick portion of the preform by a greater amount than a thin portion.

12. A method according to claim 11 wherein the superplastically forming step comprises forming the thick portion of the preform to thereby reduce the thickness of the thick portion to about the thickness of the thin portion.

13. A superplastic forming method for manufacturing a structural assembly having a predetermined contoured configuration, the method comprising: providing a preform having a stack of first and second structural members, the stack friction welded to a third structural member, the preform defining first and second portions having at least one dissimilar forming characteristic; and with the first and second members joined to the third structural member, superplastically forming at least one of the first and second structural members to a predetermined contoured configuration, wherein the first and second portions define dissimilar thicknesses, and wherein the superplastically forming step comprises superplastically forming a thick portion of the preform by a greater amount than a thin portion.

14. A method according to claim 13 wherein the superplastically forming step comprises forming the thick portion of the preform to thereby reduce the thickness of the thick portion to about the thickness of the thin portion.

* * * * *